US011326972B2

(12) United States Patent
Yen et al.

(10) Patent No.: US 11,326,972 B2
(45) Date of Patent: May 10, 2022

(54) PRESSURE SENSOR WITH IMPROVE HERMETICITY

(71) Applicant: InvenSense, Inc., San Jose, CA (US)

(72) Inventors: Pei-Wen Yen, Hsinchu (TW); Yu-Tao Lee, Zhubei (TW); Chung-Hsien Lin, Hsinchu (TW)

(73) Assignee: InvenSense, Inc., San Jose, CA (US)

( * ) Notice: Subject to any disclaimer, the term of this patent is extended or adjusted under 35 U.S.C. 154(b) by 147 days.

(21) Appl. No.: 16/875,918

(22) Filed: May 15, 2020

(65) Prior Publication Data
US 2020/0363281 A1 Nov. 19, 2020

Related U.S. Application Data

(60) Provisional application No. 62/849,678, filed on May 17, 2019.

(51) Int. Cl.
G01L 9/12 (2006.01)
G01L 19/06 (2006.01)
G01L 9/00 (2006.01)

(52) U.S. Cl.
CPC ........ G01L 19/0672 (2013.01); G01L 9/0072 (2013.01)

(58) Field of Classification Search
CPC . G01L 9/00; G01L 9/0072; G01L 9/12; G01L 19/00–14; G01L 19/0672
See application file for complete search history.

(56) References Cited

U.S. PATENT DOCUMENTS

| 4,625,561 A | 12/1986 | Mikkor |
| 4,730,496 A | 3/1988 | Knecht et al. |
| 4,769,738 A | 9/1988 | Nakamura et al. |
| 4,949,581 A | 8/1990 | Rud |
| 4,975,390 A | 12/1990 | Fujii et al. |
| 5,062,302 A | 11/1991 | Peterson et al. |
| 5,113,868 A | 5/1992 | Wise et al. |
| 5,143,583 A | 9/1992 | Marchessault et al. |
| 5,155,061 A | 10/1992 | O'Connor et al. |

(Continued)

FOREIGN PATENT DOCUMENTS

| CN | 1140504 A | 9/2003 |
| CN | 102169038 A | 8/2011 |

(Continued)

OTHER PUBLICATIONS

EP Extended Search Report dated Apr. 25, 2014 in EP Application No. 13005235.0 9 pages.

(Continued)

Primary Examiner — Nguyen Q. Ha

(57) ABSTRACT

A sensor includes a substrate, an oxide layer, a membrane, an electrode, and a trench. The oxide layer is disposed on the substrate. The membrane is positioned on the oxide layer. The membrane with the oxide layer and the substrate forms an enclosed cavity therein. The membrane comprises a rigid portion and a deformable portion wherein the deformable portion of the membrane deforms responsive to stimuli. The oxide layer forms side walls of the cavity. The electrode is positioned on the substrate and within the cavity. The trench is formed in the oxide layer, and wherein the trench is covered with barrier material.

24 Claims, 11 Drawing Sheets

(56) References Cited

U.S. PATENT DOCUMENTS

| | | |
|---|---|---|
| 5,277,068 A | 1/1994 | Fukiura et al. |
| 5,332,469 A | 7/1994 | Mastrangelo |
| 5,334,569 A | 8/1994 | Kisalus |
| 5,335,550 A | 8/1994 | Satou |
| 5,343,064 A | 8/1994 | Spangler et al. |
| 5,344,523 A | 9/1994 | Fung et al. |
| 5,395,585 A | 3/1995 | Goldstein |
| 5,407,501 A | 4/1995 | Koen et al. |
| 5,470,797 A | 11/1995 | Mastrangelo |
| 5,525,280 A | 6/1996 | Shukia et al. |
| 5,557,972 A | 9/1996 | Jacobs et al. |
| 5,576,251 A | 11/1996 | Garabedian et al. |
| 5,578,843 A | 11/1996 | Garabedian et al. |
| 5,683,594 A | 11/1997 | Hocket et al. |
| 5,867,256 A | 2/1999 | Van Rheeden |
| 5,929,498 A | 7/1999 | Ismail et al. |
| 5,936,164 A | 8/1999 | Sparks et al. |
| 6,038,928 A | 3/2000 | Maluf et al. |
| 6,074,890 A | 6/2000 | Yao et al. |
| 6,140,144 A | 10/2000 | Najafi et al. |
| 6,208,019 B1 | 3/2001 | Tane et al. |
| 6,346,742 B1 | 2/2002 | Bryzek et al. |
| 6,433,427 B1 | 8/2002 | Wu et al. |
| 6,441,451 B1 | 8/2002 | Ikeda et al. |
| 6,458,622 B1 | 10/2002 | Keser et al. |
| 6,465,271 B1 | 10/2002 | Ko et al. |
| 6,499,354 B1 | 12/2002 | Najafi et al. |
| 6,520,014 B1 | 2/2003 | Brandi |
| 6,533,554 B1 | 3/2003 | Vargo et al. |
| 6,552,404 B1 | 4/2003 | Hynes et al. |
| 6,556,418 B2 | 4/2003 | Aigner et al. |
| 6,568,274 B1 | 5/2003 | Lucas |
| 6,584,854 B2 | 7/2003 | Kimur et al. |
| 6,700,174 B1 | 3/2004 | Miu et al. |
| 6,713,828 B1 | 3/2004 | Chavan et al. |
| 6,743,656 B2 | 6/2004 | Orcutt et al. |
| 6,777,263 B1 | 8/2004 | Gan et al. |
| 6,962,867 B2 | 11/2005 | Jackson et al. |
| 6,973,835 B2 | 12/2005 | Rangsten et al. |
| 7,015,060 B1 | 3/2006 | Kubena et al. |
| 7,122,458 B2 | 10/2006 | Cheng et al. |
| 7,246,525 B2 | 7/2007 | Birkelund et al. |
| 7,273,763 B1 | 9/2007 | Neumeier et al. |
| 7,468,552 B2 | 12/2008 | Ohta et al. |
| 7,539,003 B2 | 5/2009 | Ray et al. |
| 7,704,774 B2 | 4/2010 | Mayer et al. |
| 8,008,738 B2 | 8/2011 | Villa et al. |
| 8,049,287 B2 | 11/2011 | Combi et al. |
| 8,304,919 B2 | 11/2012 | Pendse et al. |
| 8,536,663 B1 | 9/2013 | Kuo et al. |
| 8,704,318 B2 | 4/2014 | Zhou |
| 9,330,929 B1 | 5/2016 | Kautzsch et al. |
| 2001/0023087 A1 | 9/2001 | Brandi |
| 2002/0048839 A1 | 4/2002 | Miller et al. |
| 2002/0185737 A1 | 12/2002 | Regan et al. |
| 2003/0019299 A1 | 1/2003 | Hori |
| 2003/0056598 A1 | 3/2003 | Kimura et al. |
| 2003/0093895 A1 | 5/2003 | Miyazaki et al. |
| 2003/0107868 A1 | 6/2003 | Chatzandroulis |
| 2003/0143775 A1 | 7/2003 | Brady |
| 2003/0154796 A1 | 8/2003 | Ishio et al. |
| 2004/0171195 A1 | 9/2004 | Raben |
| 2005/0016289 A1 | 1/2005 | Saito et al. |
| 2005/0124159 A1 | 6/2005 | Kalvesten et al. |
| 2005/0156320 A1 | 7/2005 | Mastromatteo |
| 2005/0229711 A1 | 10/2005 | Ohms et al. |
| 2006/0014358 A1 | 1/2006 | Sawyer et al. |
| 2006/0027522 A1 | 2/2006 | Martin et al. |
| 2006/0032039 A1 | 2/2006 | Rangsten et al. |
| 2006/0063354 A1 | 3/2006 | Fortin et al. |
| 2006/0097331 A1 | 5/2006 | Haltori et al. |
| 2006/0169049 A1 | 8/2006 | Matsubara |
| 2006/0243054 A1 | 11/2006 | Saito et al. |
| 2007/0019101 A1 | 1/2007 | Minamio et al. |
| 2007/0141808 A1 | 6/2007 | Firtin et al. |
| 2007/0275495 A1 | 11/2007 | Meyer et al. |
| 2008/0016683 A1 | 1/2008 | Brida et al. |
| 2008/0036082 A1 | 2/2008 | Eun |
| 2008/0061412 A1 | 3/2008 | Shena et al. |
| 2008/0236292 A1 | 10/2008 | Reijs |
| 2008/0251705 A1 | 10/2008 | Tseng |
| 2009/0166827 A1 | 7/2009 | Foster et al. |
| 2009/0322929 A1 | 12/2009 | Webster |
| 2010/0055821 A1 | 3/2010 | Buhler et al. |
| 2010/0109140 A1 | 5/2010 | Oh et al. |
| 2010/0139409 A1 | 6/2010 | Mischke et al. |
| 2010/0171153 A1 | 7/2010 | Yang |
| 2010/0207217 A1 | 8/2010 | Zuniga-Ortis et al. |
| 2010/0242605 A1 | 9/2010 | Ofterdinger |
| 2011/0027930 A1 | 2/2011 | El-Gamal et al. |
| 2011/0108932 A1 | 5/2011 | Benzel |
| 2011/0154905 A1 | 6/2011 | Hsu |
| 2011/0230068 A1 | 9/2011 | Pahl |
| 2012/0024075 A1 | 2/2012 | Peng |
| 2012/0037935 A1 | 2/2012 | Yang |
| 2012/0037953 A1 | 2/2012 | Hayano |
| 2013/0093030 A1 | 4/2013 | Isebrand et al. |
| 2013/0127000 A1 | 5/2013 | Oganesian |
| 2013/0181314 A1 | 7/2013 | Ryu et al. |
| 2013/0264755 A1 | 10/2013 | Eskridge |
| 2013/0276544 A1 | 10/2013 | Potasek et al. |
| 2014/0151822 A1 | 6/2014 | Graham |
| 2015/0040675 A1 | 2/2015 | Ding |
| 2015/0048461 A1 | 2/2015 | Mayer |
| 2015/0061049 A1 | 3/2015 | Weber |
| 2015/0122038 A1 | 5/2015 | Mayer et al. |
| 2015/0122041 A1 | 5/2015 | Lin |
| 2015/0122042 A1 | 5/2015 | Lin et al. |
| 2015/0260593 A1 | 9/2015 | Hsu et al. |
| 2015/0268115 A1 | 9/2015 | Robert et al. |
| 2015/0270180 A1 | 9/2015 | Yang |
| 2016/0025583 A1 | 1/2016 | Besling et al. |
| 2016/0290883 A1 | 10/2016 | Schumm |
| 2017/0122825 A1 | 5/2017 | Naumann |
| 2017/0210618 A1 | 7/2017 | Chang |
| 2018/0188127 A1* | 7/2018 | Ermolov .......... B81C 1/00182 |

FOREIGN PATENT DOCUMENTS

| | | |
|---|---|---|
| DE | 10027234 A1 | 12/2000 |
| DE | 19929025 A1 | 12/2000 |
| DE | 10-2009-046692 A1 | 5/2001 |
| DE | 10201054 A1 | 1/2003 |
| DE | 10-2005-008959 A1 | 9/2006 |
| DE | 10-2010-001073 A1 | 7/2011 |
| EP | 0155517 A2 | 9/1985 |
| EP | 0596711 A2 | 5/1994 |
| EP | 0633459 A2 | 1/1995 |
| EP | 0993778 A1 | 4/2000 |
| EP | 0992778 A2 | 4/2001 |
| EP | 1555517 A2 | 7/2005 |
| EP | 1860417 A2 | 11/2007 |
| EP | 2075221 A2 | 7/2009 |
| EP | 2135839 A2 | 12/2009 |
| EP | 2246292 A2 | 11/2010 |
| EP | 2421037 A1 | 2/2012 |
| EP | 2647594 A2 | 10/2013 |
| EP | 2653443 A2 | 10/2013 |
| EP | 2790214 A1 | 10/2014 |
| EP | 2871455 A1 | 5/2015 |
| EP | 3239681 A1 | 11/2017 |
| JP | 2729005 | 12/1997 |
| JP | 2001124649 A | 5/2001 |
| JP | 2007-057238 A | 3/2007 |
| KR | 1020050075225 A | 7/2005 |
| WO | 2003/006387 A2 | 1/2003 |
| WO | 2003-034016 A1 | 4/2003 |
| WO | 03/036387 A2 | 5/2003 |
| WO | 2004-106879 A1 | 12/2004 |
| WO | 00/036387 A1 | 6/2006 |

(56) References Cited

FOREIGN PATENT DOCUMENTS

| WO | 2007/117198 A1 | 10/2007 |
|----|----------------|---------|
| WO | 2007120576 A2  | 10/2007 |

OTHER PUBLICATIONS

Klaassen, et al., "Silicon Fusion Bonding and Deep Reactive Ion Etching; A New Technology From Microstructures," The 8th International Conference on Solid-State Sensors and Actuators, and Eurosensors IX, Stockholm, Sweden, Jun. 25-29, 1995 4 pages.

Allan, Roger, "Ever-Shrinking Ics Turn to Exotic Packaging Methods," Jan. 15, 2009, Electronic Design, retrieved from http://electronicdesign.com/interconnects/ever-shrinking-ics-turn-exotic-packaging-methods. 4 pages.

Allan, Rogers, "MEMS Inertial Sensors Push Size, Performance Limits for Next-Gen Mobile Devices," Apr. 14, 2010, Electronic Design, retrieved from https://eletronicdesign.com/components/mems-inertial-sensors-push-size-performance-limits-next-gen-mobile-devices. 6 pages.

Allan, Roger, Figure 2 in "Ever-Shrinking ICs Turn to Exotic Packaging Methods," Jan. 15, 2009, Electronic Desgin, Retrieved from https://electronicdesign.com/site-files/electronicdesign.com/files/archive/electronicdesign.com/files/29/2037/fig_02_gif. 1 page.

Allan, Roger, Figure 8 in "MEMS Inertial Sensors Push Size, Performance Limits for Net-Gen Mobile Devices," Apr. 14, 2010, Electronic Design, retrieved from https://electronicdeisng.com/site-files/electronicdesign.com/files/archive/electronicdesign.com/Content/14978/60071_fig_08.jpg. 1 page.

Baltes, et al., CMOS-based Microsensors and Packaging, Semsors and Actuators, vol. 92, No. 1-3 pp. 1-9, Aug. 1, 2011 9 pages.

EP Extended Search Report dated Apr. 3, 2013 in EP Application No. 12007333.3 6 pages.

EP Extended Search Report dated Apr. 28, 2014 in EP Application No. 13005236.8 11 pages.

EP Extended Search Report dated Dec. 9, 2010 in EP Application No. 10009453.1 7 pages.

EP Extended search Report dated May 31, 2016 in EP Application No. 13005235.0 11 pages.

EP Wxtended Search Report dated Nov. 20, 2015 in EP Application No. 15173033.0 10 pages.

EP Extended Search Report dated Oct. 2, 2015 in EP Application No. 15000967.8 6 pages.

EP Extended Search Report dated Oct. 20, 2009 in EP Application No. 07008470.2 18 pages.

EP Extended Search Report dated Oct. 11, 2006 in EP Application No. 06010606.9 10 pages.

Kiihamaki, et al., "Integrated Pressure Sensors on SOI," Micro Structure Workshop, 2004 4 pages.

Petersen, et al., "Silicon Fusion Bonding for Pressure Sensors," NovaSensor, TH215-4/88/0000-01444, pp. 144-147. 4 pages.

Wikipedia, "Silicon On Insulator," Oct. 17, 2013, pp. 1-5 5 pages.

IPRP received for WO Patent Application Serial No. PCT/US20/33289 dated Dec. 2, 2021, 07pages.

* cited by examiner

PRESSURE SENSOR WITH IMPROVE HERMETICITY

BACKGROUND

Maintaining cavity pressure for certain sensors, e.g., pressure sensors, is desirable. Unfortunately, pressure sensors suffer from high pressure error drift, e.g., over 300 Pa, due to poor hermetic sealing of the pressure sensor fusion bond interface, which results in gas effect over time. Gas effect may result in a change in the cavity pressure, thereby causing error drift.

In some traditional systems, an oxide layer is used to reduce gas effect. Although the use of oxide layer improves hermicity nonetheless, gas effect still occurs.

SUMMARY

Accordingly, a need has arisen to improve sensor hermetic seal. It is appreciated that in some embodiments, a material which equipped good hermeticity capability, such as metal or high density dielectric material, e.g., Nitride film, may be used as a barrier layer to improve cavity hermetic seal. Moreover, a trench may be used to isolate the core pressure cavity from the main oxide structure layer of the sensor. It is appreciated that improving the hermetic seal of the oxide interface may assist in further reducing gas effect. It is further appreciated that in some embodiments, the lateral wall(s) of the cavity may further be coated with a barrier layer such as metal or Nitride film, such Silicon nitride, etc., to further reduce the gas effect.

In some embodiments, a sensor includes a substrate, an oxide layer, a membrane, an electrode, and a trench. The oxide layer is disposed on the substrate. The membrane is positioned on the oxide layer. The membrane with the oxide layer and the substrate form an enclosed cavity therein. The membrane comprises a rigid portion and a deformable portion wherein the deformable portion of the membrane deforms responsive to stimuli. The oxide layer forms side walls of the cavity. The electrode is positioned on the substrate and within the cavity. The trench is formed in the oxide layer, and wherein the trench is covered with barrier material.

It is appreciated that in some embodiments the trench surrounds the cavity. The trench may be disposed between the cavity and an outer periphery of the sensor. According to some embodiments, the trench extends into the rigid portion of the membrane. The trench faces external environment and away from the substrate in some embodiments. It is appreciated that the barrier material comprises at least one of silicon nitride or metal layer.

In some embodiments a sensor includes a substrate, an oxide layer, a membrane, an electrode and a trench. The oxide layer may be disposed on the substrate. It is appreciated that the membrane may be positioned on the oxide layer. According to some embodiments the membrane, the oxide layer and the substrate form an enclosed cavity therein. In some embodiments, the membrane comprises a rigid portion and a deformable portion. The deformable portion deforms responsive to stimuli. The oxide layer forms side walls of the cavity. The electrode is positioned on the substrate and within the cavity. The trench is formed in the oxide layer and enclosed by the membrane and the substrate.

It is appreciated that the sensor may further include a vent hole formed within the rigid portion of the membrane. In some embodiments, the trench and the vent hole are aligned and connected to one another. It is appreciated that in some embodiments the vent hole is sealed by a cap and the cap is coated with a layer of barrier material.

In some embodiments a sensor includes a substrate, an oxide layer, a membrane, and an electrode. The oxide layer is disposed on the substrate. The membrane is positioned on the oxide layer. The membrane with the oxide layer and the substrate form an enclosed cavity therein. The oxide layer comprises an inner wall that extends laterally from the membrane to the substrate and forming side walls of the cavity. The oxide layer comprises an outer wall that extends laterally from the membrane to the substrate facing away from the cavity. The membrane comprises a rigid portion and a deformable portion wherein the deformable portion deforms responsive to stimuli. The inner wall or the outer wall is coated with a layer of barrier material. The electrode is positioned on the substrate and within the cavity.

It is appreciated that the layer of barrier material comprises at least one of silicon nitride or metal layer. In some embodiments the oxide layer is a high density plasma oxide layer. According to some embodiments, a top surface of the substrate is coated with another layer of barrier material.

It is appreciated that the sensor may further include a trench formed within the rigid portion of the membrane. It is appreciated that the trench may be sealed by a cap. It is appreciated that the trench may be coated with a layer of barrier material.

In some embodiments the sensor may further include a trench formed within the oxide layer. The sensor may also include a vent hole formed within the rigid portion of the membrane. In some embodiments, the trench and the vent hole are aligned and wherein the vent hole is capped.

These and other features and aspects of the concepts described herein may be better understood with reference to the following drawings, description, and appended claims.

DESCRIPTION

Figure 1A:
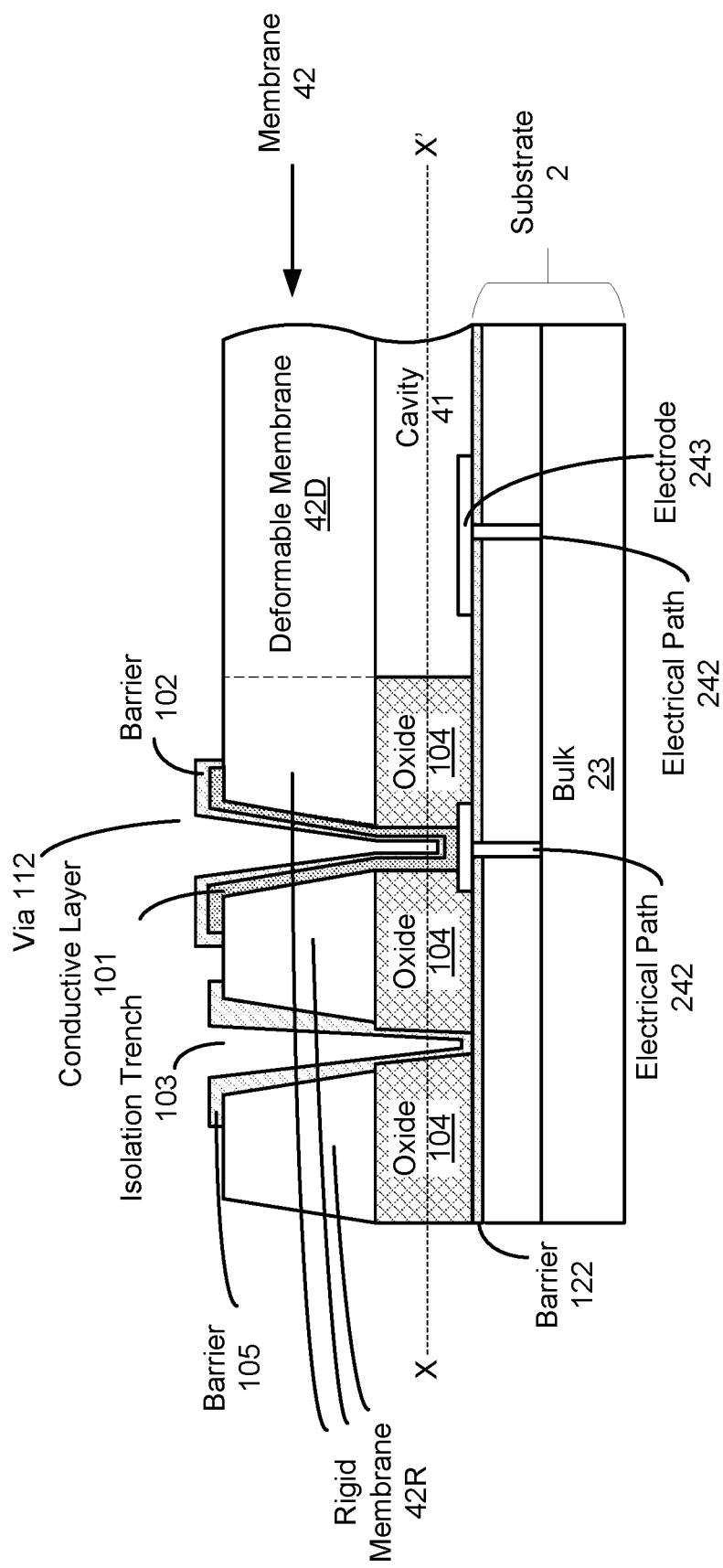
FIG. 1A shows a sensor device with an isolation trench positioned in the periphery of the membrane coated with a barrier layer according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," "lateral," "forming," "formation," "reducing," "applying," "pulling," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

It is appreciated that in some embodiments, the pressure sensor may be a monolithic device where a MEMS layer is deposited over silicon substrate. In some embodiments, the cavity can be formed in the MEMS substrate. It is appreciated that a portion of the MEMS substrate may be removed to form a deformable membrane from the silicon layer. The MEMS substrate is electrically connected to the circuitry on the silicon substrate. It is appreciated that the deformable membrane may be sensitive to stress in a pressure sensor. When a pressure sensor is mounted to a carrier and is electrically connected thereto, mechanical stress may be evoked and transmitted via solder balls to the MEMS substrate and specifically to stress sensitive structures of the pressure sensor such as the deformable membrane. According to some embodiments an absolute pressure sensor with a deformable membrane that has a separation between a cavity within the case of an absolute pressure sensor an essentially constant pressure and a port open to the outside of the sensor.

It is appreciated that in some embodiments, an oxide layer may be disposed between the substrate and the deformable membrane. However, in order to further reduce the gas effect, a barrier material e.g., Nitride film, $SiN_x$ or metal material, etc., may be used as a barrier layer. For example, it is appreciated that a lateral wall of the oxide layer disposed between the substrate and the membrane may be coated with barrier material in order to improve hermeticity.

According to one embodiment, a trench positioned in rigid portion of the membrane may be used to isolate the core pressure cavity from the main oxide structure layer of the sensor. It is appreciated that improving the hermetic seal of the fusion bond interface may assist in further reducing the gas effect. It is further appreciated that the isolation trench approach may be combined with the use of high density dielectric material coating the wall(s) of the oxide layer disposed between the deformable membrane and the substrate. Accordingly, hermetic can be improved.

The term "pressure sensor" as used herein designates any type of sensor measuring a parameter that is equal to or derived from the pressure of a fluid. In particular, the term designates relative (i.e. differential) as well as absolute pressure sensors, it also covers static as well as dynamic pressure sensors. Typical examples of applications of such sensors are e.g., in scientific instrumentation, meteorology, altitude measurement, sound recording, mobile or portable computers and phones etc. In the described embodiments, gas effect refers to outgassing as well as leakage over a period of time.

Referring now to FIG. 1A, a sensor device with an isolation trench in the periphery of the deformable membrane according to one aspect of the present embodiments is shown. The device as shown includes a membrane 42 that is bonded, e.g., fusion bonded, to the substrate 2, e.g., a silicon substrate, forming a cavity 41 therein. The membrane has a rigid portion 42R and a deformable portion 42D. The deformable membrane 42D is positioned over the cavity and moves in response to external stimuli or internal actuation. It is appreciated that the cavity 41 may be formed by omitting or removing material from one or more of the layers. The cavity 41 is closed by a deformable membrane 42D. The deformable membrane 42D is sufficiently thin such that it deforms depending on a pressure differential between a pressure at the top of the deformable membrane 42D and below it. The deformable membrane 42D is exposed to environment in order to sense the pressure.

The substrate 2 may include a bulk material 23, e.g., silicon and a stack of oxide and metal layers on the bulk material 23. These layers may comprise electrical circuits for processing of electrical signals, and as such may also be denoted as CMOS layers. Specifically, the layers can include for example a plurality of $SiO_2$ layers, metal or polysilicon layers, etc. The bulk material 23 may contain doped regions within the silicon. These components can form active circuitry, such as amplifiers, A/D converters or other analog and/or digital signal processing units. A top layer of the stack of layers may be a dielectric layer of silicon oxide and/or silicon nitride, e.g., $SiN_x$, protecting the structures below it. It is appreciated that a dielectric barrier layer 122 such as $SiN_x$ may also improve cavity 41 hermeticity. In the present example, the bulk silicon 23 oxide and electrical processing circuit is collectively referred to as substrate 2. An electrode 243 comprising metal layers may be positioned on a top layer of the substrate 2 and it may be arranged at the bottom of the cavity 41 facing the deformable membrane 42D.

According to some embodiments, the membrane 42 may be formed by a doped conducting silicon layer and it may be arranged as a sealing lid over the cavity 41. As such, the deformable membrane 42D may be used as another electrode that generates electrical signals in response to external stimuli, e.g., pressure. Hence upon a change in pressure the deformable membrane 42D deflects and as such a distance between the two electrodes changes, which results in a change of the capacitance between the two electrodes. In other words, the sensing means may in one embodiment contain the deformable membrane 42D itself serving as one electrode and as such containing electrically conducting material. Moreover, the electrode 243 that is stationary may serve as another electrode and it may be arranged in the cavity 41 to allow sensing a capacitance between the two electrodes, e.g., electrode 243 and the deflectable membrane 42D. It is appreciated that the capacitance is dependent on the distance between the electrodes. For example, in case a medium such as air is applied to the cavity 41 at a defined pressure and a deflection of the deformable membrane 42D is evoked, a distance between the electrodes may change and result in a change in capacitance. In one embodiment, any of the electrodes may be formed from a metal layer or a polysilicon layer.

The via 112 is coated with a conductive layer 101. The conductive layer 101 connects the electrical circuit path 242 to outside the sensor. The electrical signal generated by the deformable membrane 42D, e.g., change in capacitance between the deformable membrane 42D and the electrode 243, responsive to pressure, e.g., change in pressure, is transmitted to substrate 2. It is appreciated that in some embodiments a dielectric layer such as barrier layer 102 may coat the conductive layer 101.

It is appreciated that in some embodiments, the membrane 42 and the substrate 2 sandwich a layer of dielectric material such as an oxide layer 104 may be present. It is appreciated that the oxide layer 104 may be a fusion bond oxide or a high density plasma (HDP) layer, HDP oxide, etc. In one example, the oxide layer 104 is positioned between the top surface of the substrate 2 and the membrane 42. In other words, the oxide layer 104 may form the side walls of the cavity 41 also referred to as the inner wall. In other words, the oxide layer 104 may form the side walls on the exterior of the device also referred to as outer wall. In some embodiments, the top layer of the substrate 2 is coated with a different dielectric such as barrier layer 122 in order to further improve hermiticity of the cavity in addition to protecting the underlying layers of the substrate 2.

Isolation trench 103 is formed within the rigid membrane 42D. The isolation trench 103 is formed in the membrane 42 outside the cavity 41. In one embodiment, the isolation trench 103 extends into the oxide layer 104. In one nonlimiting example, the isolation trench 103 extends from the rigid membrane 42D all the way through the oxide layer 104 and reaches the top layer, e.g., barrier layer 122, of the substrate 2. The isolation trench 103 is further configured to improve the hermeticity of the cavity 41.

In this embodiment, the isolation trench 103 is coated with a barrier material layer 105 layer to further assist in improving the hermeticity of the cavity 41. It is appreciated that in some embodiments, the isolation trench 103 may be covered with a metal material, i.e. capped or sealed, in order to further reduce the gassing effect. It is further appreciated that the cap may further be coated with a layer of barrier layer. It is appreciated that positioning the isolation trench in the exterior portion is for illustrative purposes and should not be construed as limiting the scope of the embodiments. For example, the isolation trench 103 may be positioned anywhere in the oxide layer 104 between the cavity 41 and the periphery of the device. It is appreciated that in some embodiments, the isolation trench 103 may be sealed with a cap, e.g., metal.

Figure 1B:
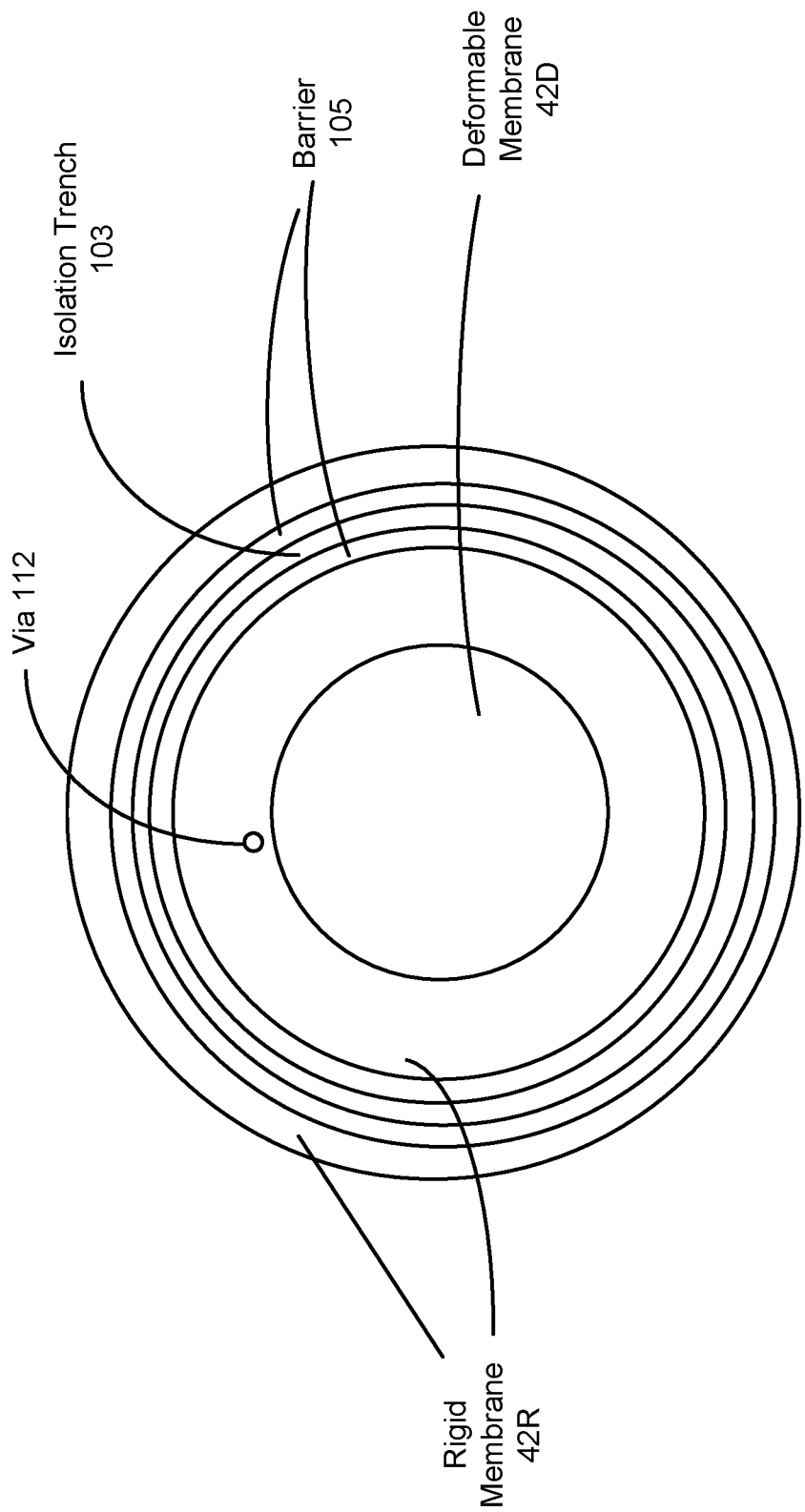
FIG. 1B shows a top view of FIG. 1A according to one aspect of the present embodiments.

FIG. 1B shows the top view of FIG. 1A.

Figure 2A:
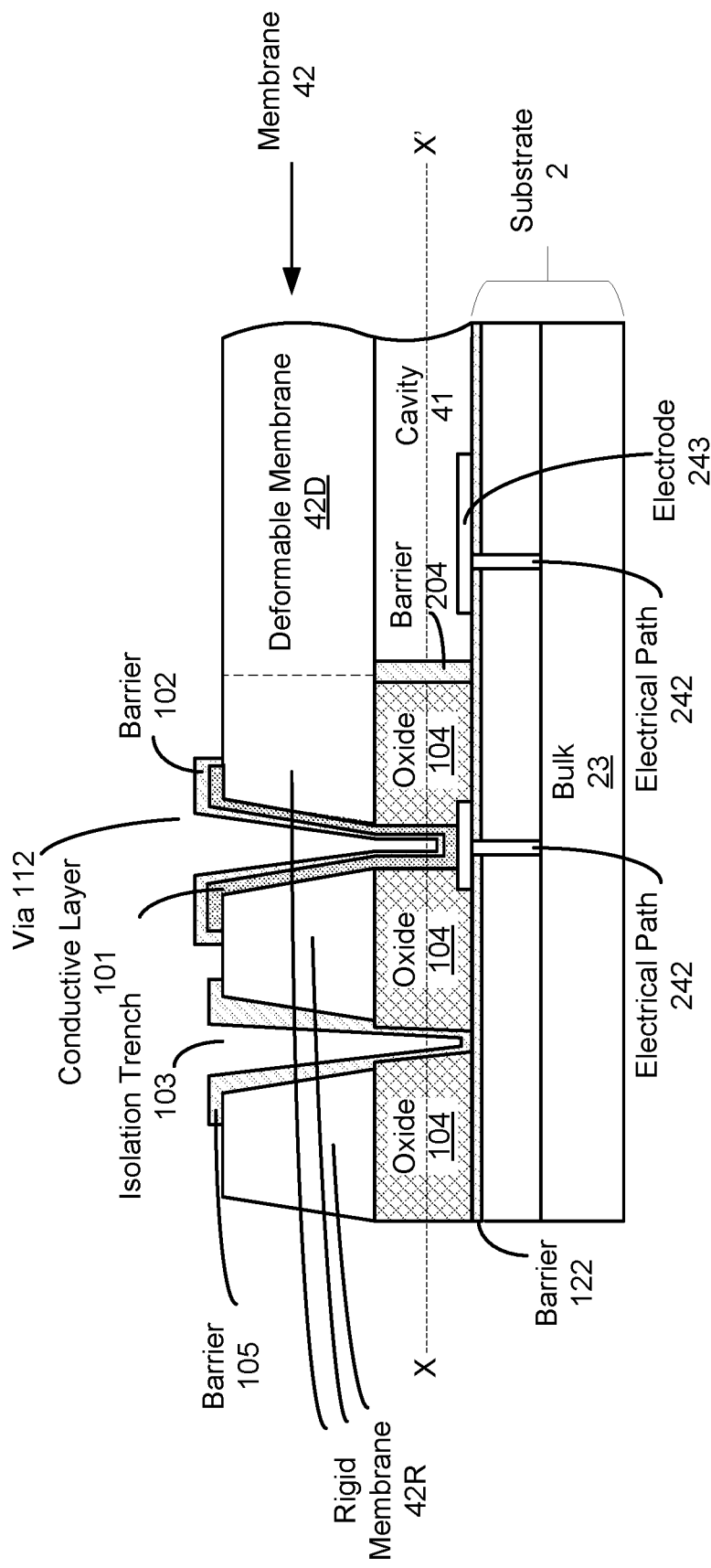
FIG. 2A shows a sensor device with a barrier layer coating on the side walls of the cavity according to one aspect of the present embodiments.

FIG. 2A shows a sensor device with a high density dielectric coating on the side walls of the cavity according to one aspect of the present embodiments. FIG. 2A is substantially similar to that of FIG. 1A except that the barrier layer 204 improves the hermeticity of the cavity 41. It is appreciated that in some embodiments a barrier layer 204 such as $SiN_x$, may laterally cover the oxide layer 104 that is within the cavity 41. In other words, the oxide layer 104 that forms side walls of the cavity 41 is covered with the barrier layer 204. In some embodiments, the barrier layer 204 may extend from the rigid membrane 42R to the top of the substrate 2, e.g., barrier layer 122, and cover the oxide layer 104 laterally. It is appreciated that the barrier layer 204 laterally covering the oxide layer 104 is for illustrative purposes and should not be construed as limiting the embodiments. For example, in some embodiments, the barrier 204 layer while laterally covering the oxide layer 104 may not completely cover it. In other words, the barrier layer 204 may partially cover the lateral wall of the oxide layer 104 within the cavity 41. It is appreciated that in some embodiments, the isolation trench 103 may be used in combination with covering the lateral walls of the oxide layer 104 with a barrier layer 204.

Figure 2B:
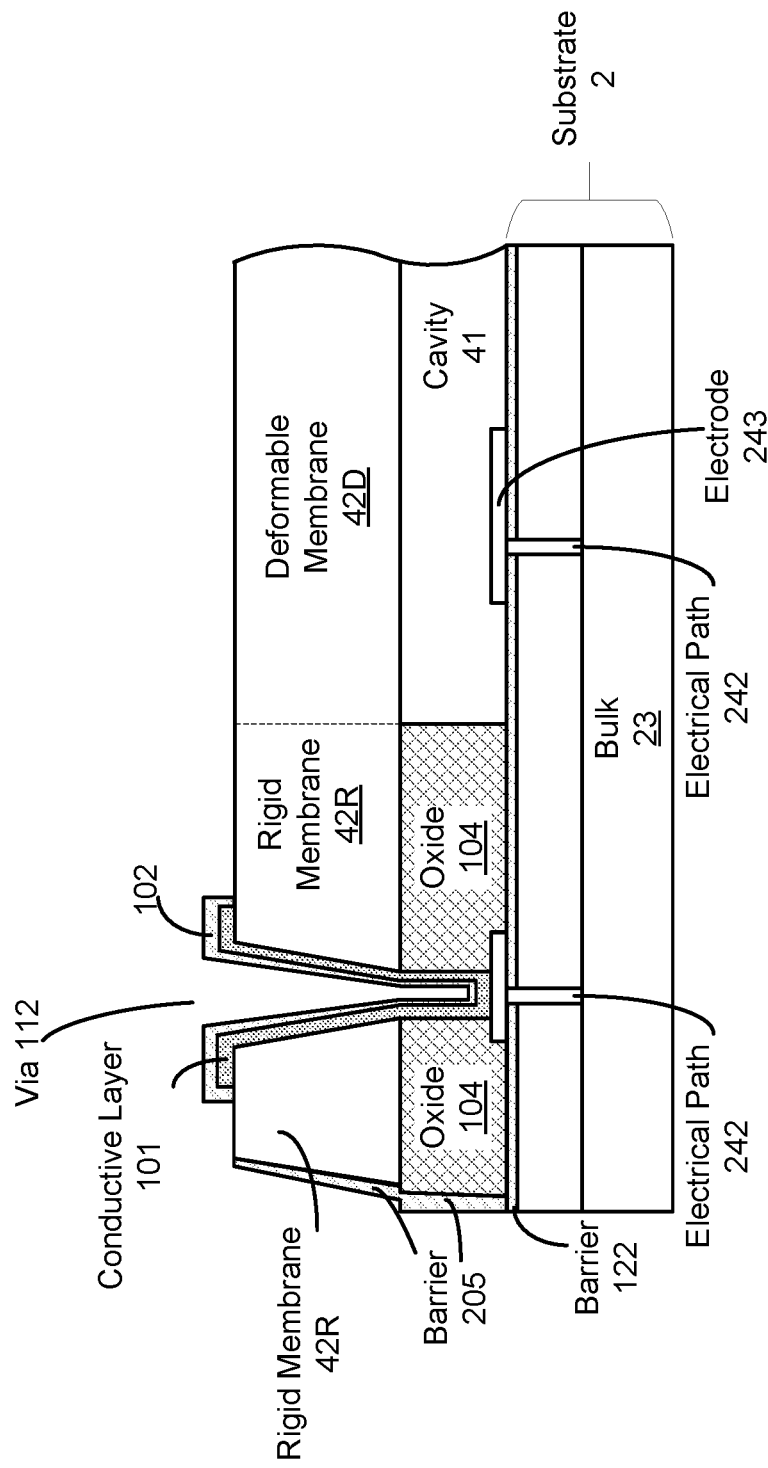
FIG. 2B shows a sensor device with a lateral barrier layer, positioned differently from FIG. 2A, coating an oxide layer according to one aspect of the present embodiments.

Referring now to FIG. 2B shows a sensor device with a barrier layer, positioned differently from FIG. 2A, coating an oxide layer according to one aspect of the present embodiments. FIG. 2B is substantially similar to that of FIG. 2A, however, in this embodiment, the barrier layer 205 laterally covering the oxide layer 104 is positioned on the outer walls of oxide layer 104. As such, barrier layer 205 covers the lateral wall of the oxide layer 104 positioned on the periphery or perimeter of the oxide layer 104. The barrier layer 205 extends to the top surface of the substrate 2, e.g., barrier layer 122. In some embodiments, the barrier layer 205 covers the exterior side walls of the rigid membrane 42R.

Figure 2C:
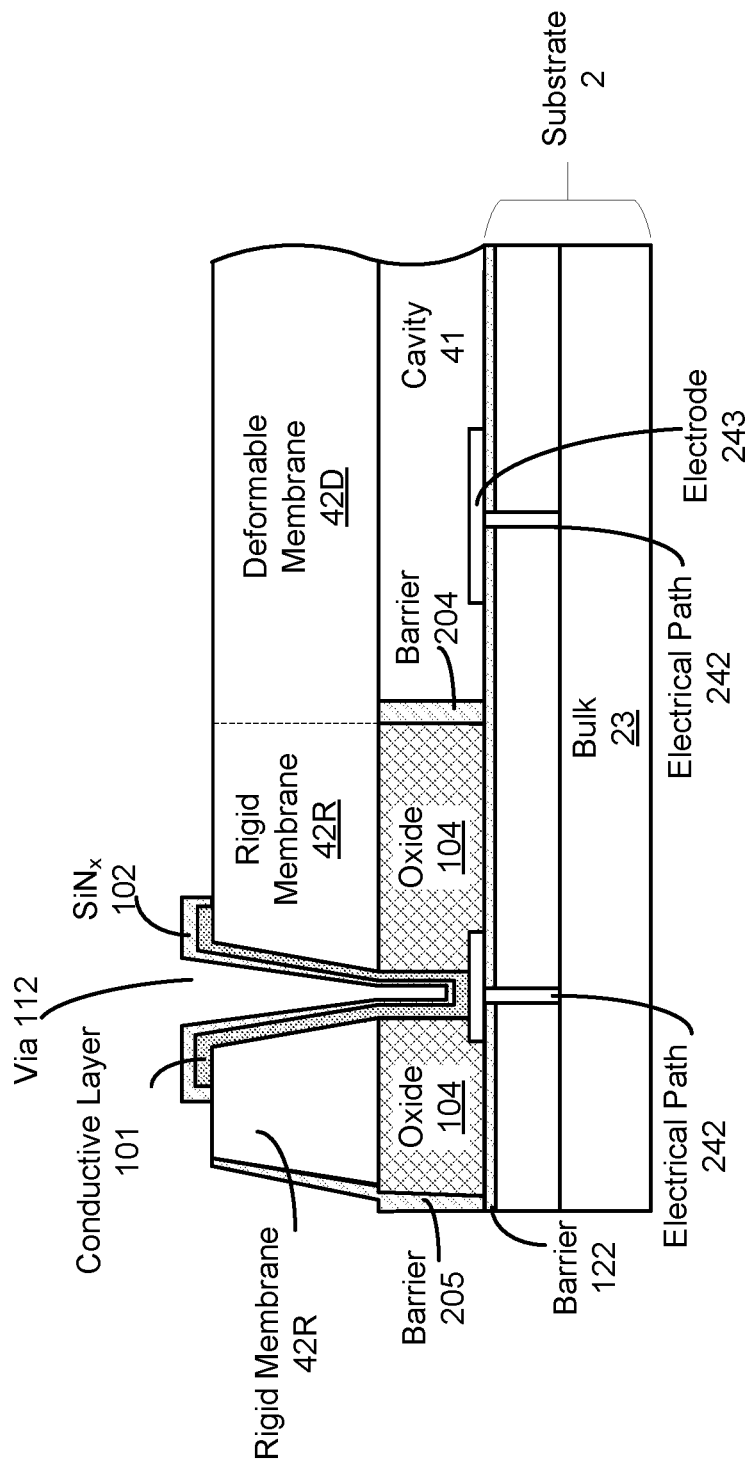
FIG. 2C shows a sensor with two lateral barrier layer coating the oxide layer according to one aspect of the present embodiments.

FIG. 2C shows a sensor with two barrier layers coating the oxide layer according to one aspect of the present embodiments. FIG. 2C is a combination of embodiments in FIGS. 2A and 2B. In other words, the barrier layer 204 covers the lateral wall of the oxide layer 104 in the cavity 41 and the barrier layer 205 covers the lateral wall of the oxide layer 104 on the periphery. In some embodiments, barrier layer 205 extends to the exterior side walls of the rigid membrane 42R. In some embodiments, isolation trench 103 can be used (not shown in this example) in conjunction with barrier layers covering the side walls of oxide layer 104.

Figure 2D:
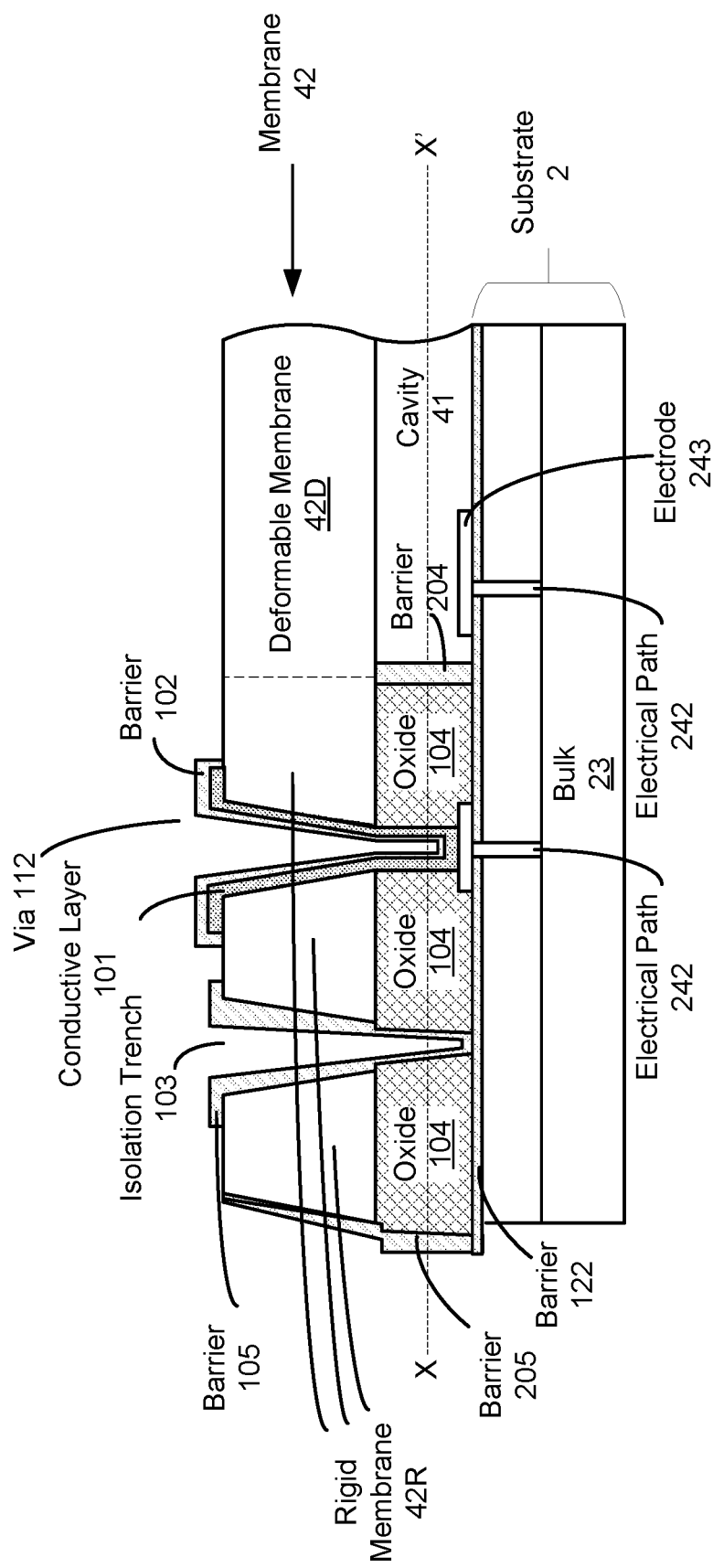
FIG. 2D shows a sensor with an isolation trench and oxide layer coated with barrier layer according to one aspect of the present embodiments.

FIG. 2D shows a sensor with a deep trench and two barrier layers coating the oxide layer according to one aspect of the present embodiments. Figure D is a combination of embodiments in FIGS. 1A, 2A and 2B. Barrier layer 105 covering the isolation trench 103 improves hermiticity. The barrier layer 204 on the inner wall of the oxide layer and the barrier layer 205 on the outer side walls of the oxide layer and side walls of the rigid membrane further improves the hermiticity of the cavity.

Figure 3A:
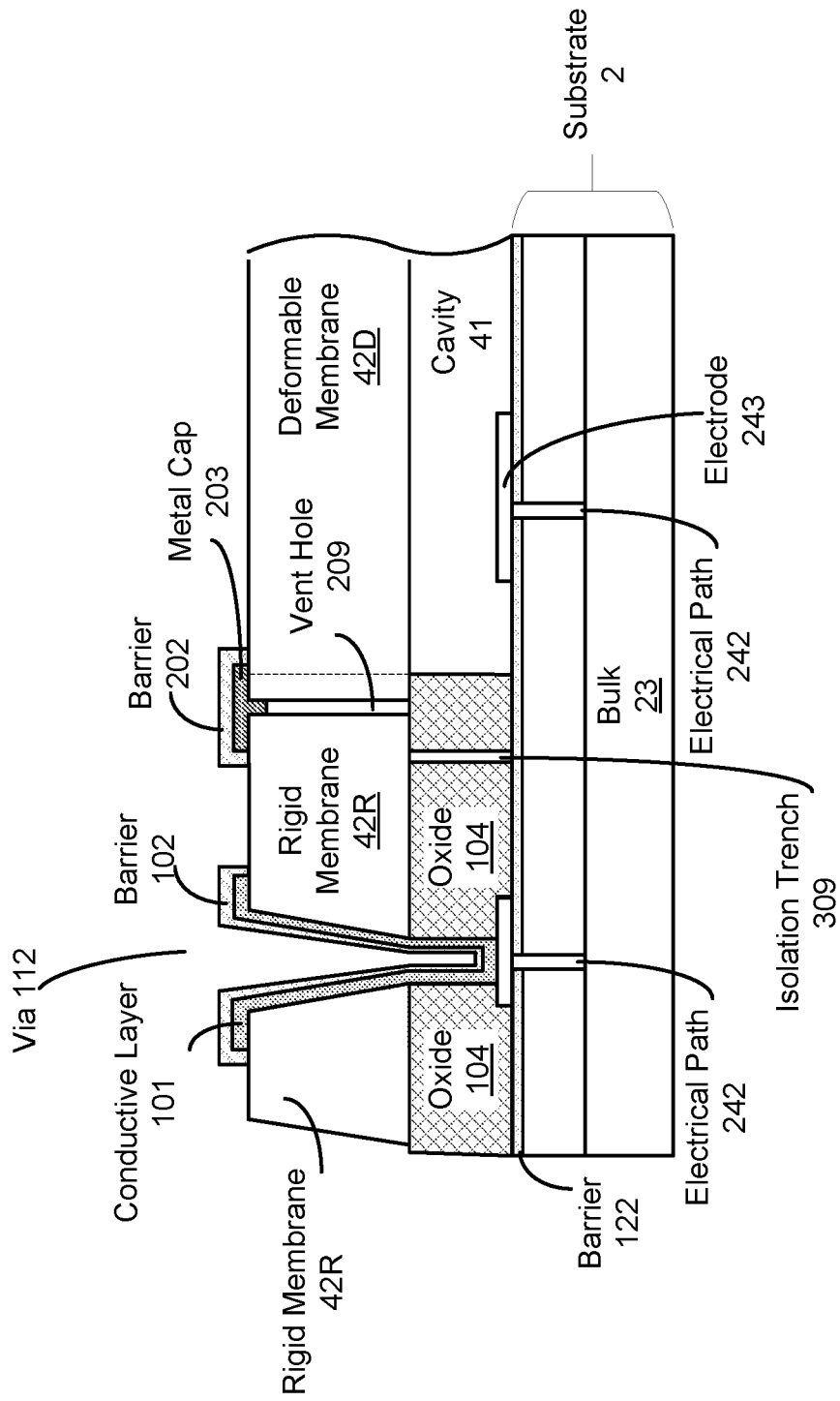
FIG. 3A shows a sensor device with a deep isolation trench in the interior portion of the membrane according to one aspect of the present embodiments.

Referring now to FIG. 3A, a sensor device with a deep isolation trench in the oxide layer 104 according to one aspect of the present embodiments is shown. FIG. 3A is substantially similar to that of FIG. 2A except that an isolation trench 309 is formed within the oxide layer 104 between the cavity and the periphery. The isolation trench 309 is formed between the rigid membrane 42R and the substrate 2 and it reaches the top surface of the substrate 2, e.g., barrier layer 122 layer. It is appreciated that the isolation trench 309 may be positioned anywhere within the oxide layer 104 adjacent to the cavity 41. In some embodiments, the isolation trench 309 lines up with vent hole 209. Vent hole 209 is a trench in the rigid membrane 42R. In some embodiments, the vent hole 209 is capped with a metal cap 203 and further covered with barrier layer 202.

Figure 3B:
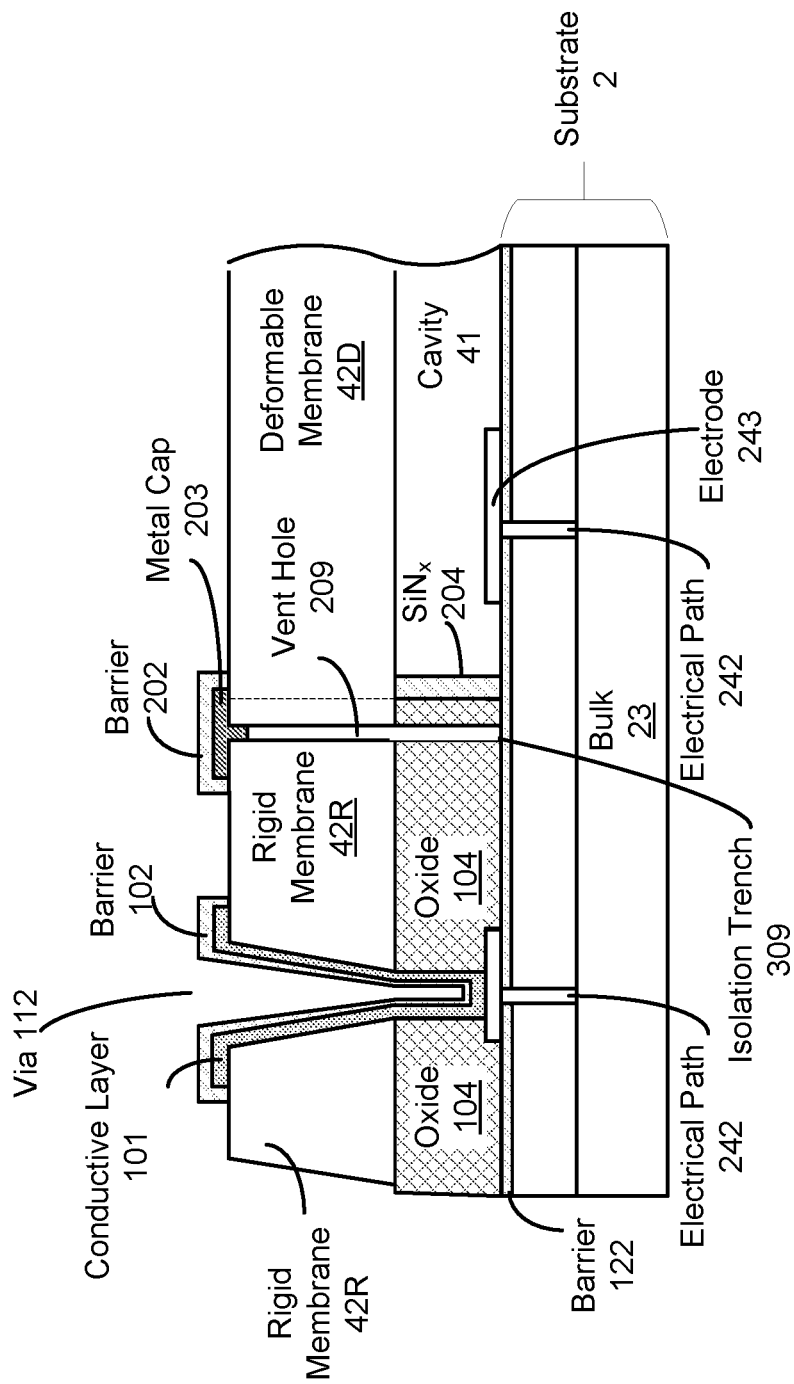
FIG. 3B shows a sensor device with a deep isolation trench in the interior portion of the membrane and one lateral barrier layer coating an oxide layer according to one aspect of the present embodiments.

FIG. 3B shows a sensor device with a deep isolation trench in the oxide layer 104 aligned with vent hole 209 according to one aspect of the present embodiments. In some embodiments the barrier layer 204 layer covers the lateral wall of the oxide layer 104 within the cavity 41 to further improve the hermiticity.

Figure 3C:
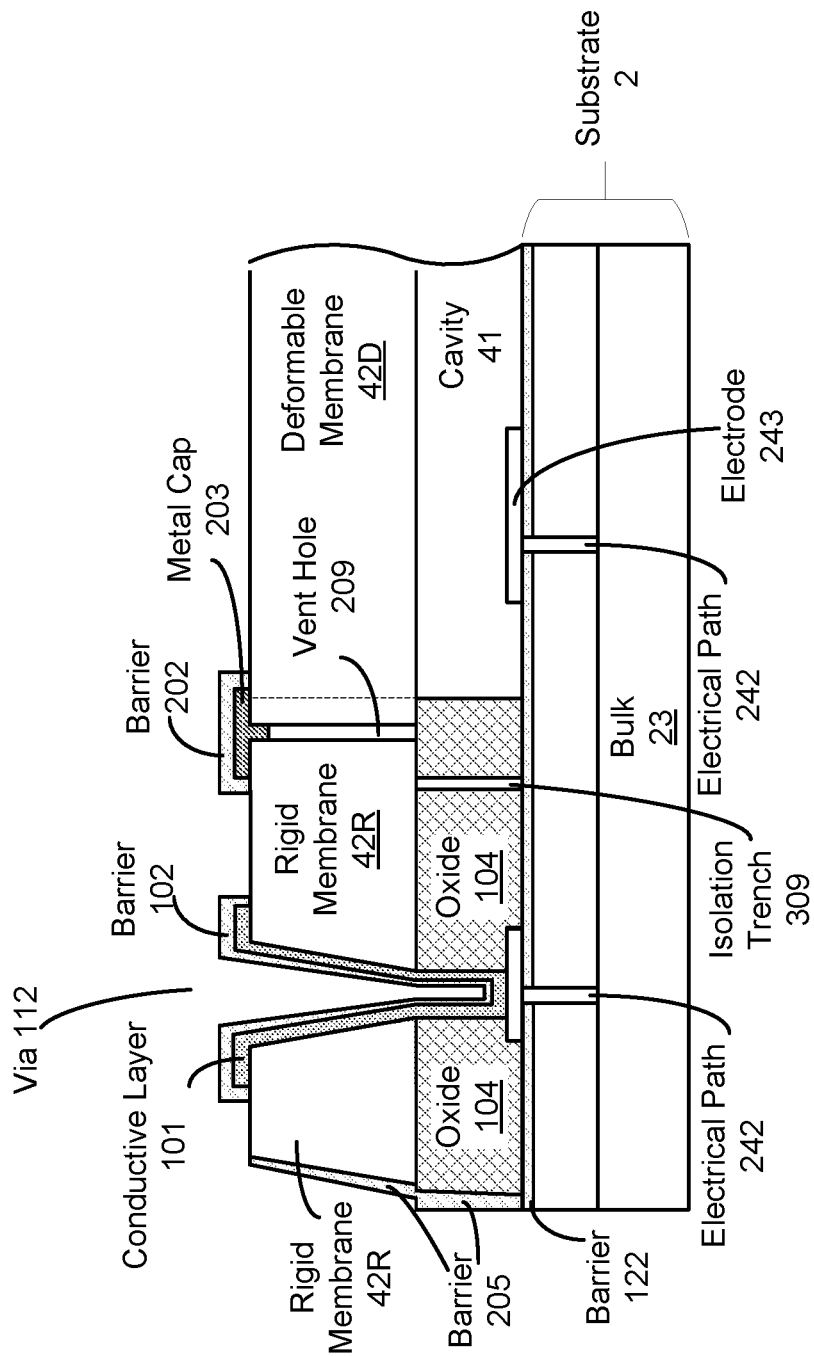
FIG. 3C shows a sensor device with a deep isolation trench in the interior portion of the membrane and one lateral barrier layer, positioned differently from FIG. 3B, according to one aspect of the present embodiments.

FIG. 3C shows a sensor device with a deep isolation trench in the oxide layer and barrier layer on the outer perimeter of the device, positioned differently from FIG. 3B, according to one aspect of the present embodiments. In this embodiment, the barrier layer 205 layer covers the lateral wall of the oxide layer 104. In some embodiments, barrier layer 205 covers the side walls of the rigid membrane. In some embodiments, the isolation trench 309 can align with the vent hole 209.

Figure 3D:
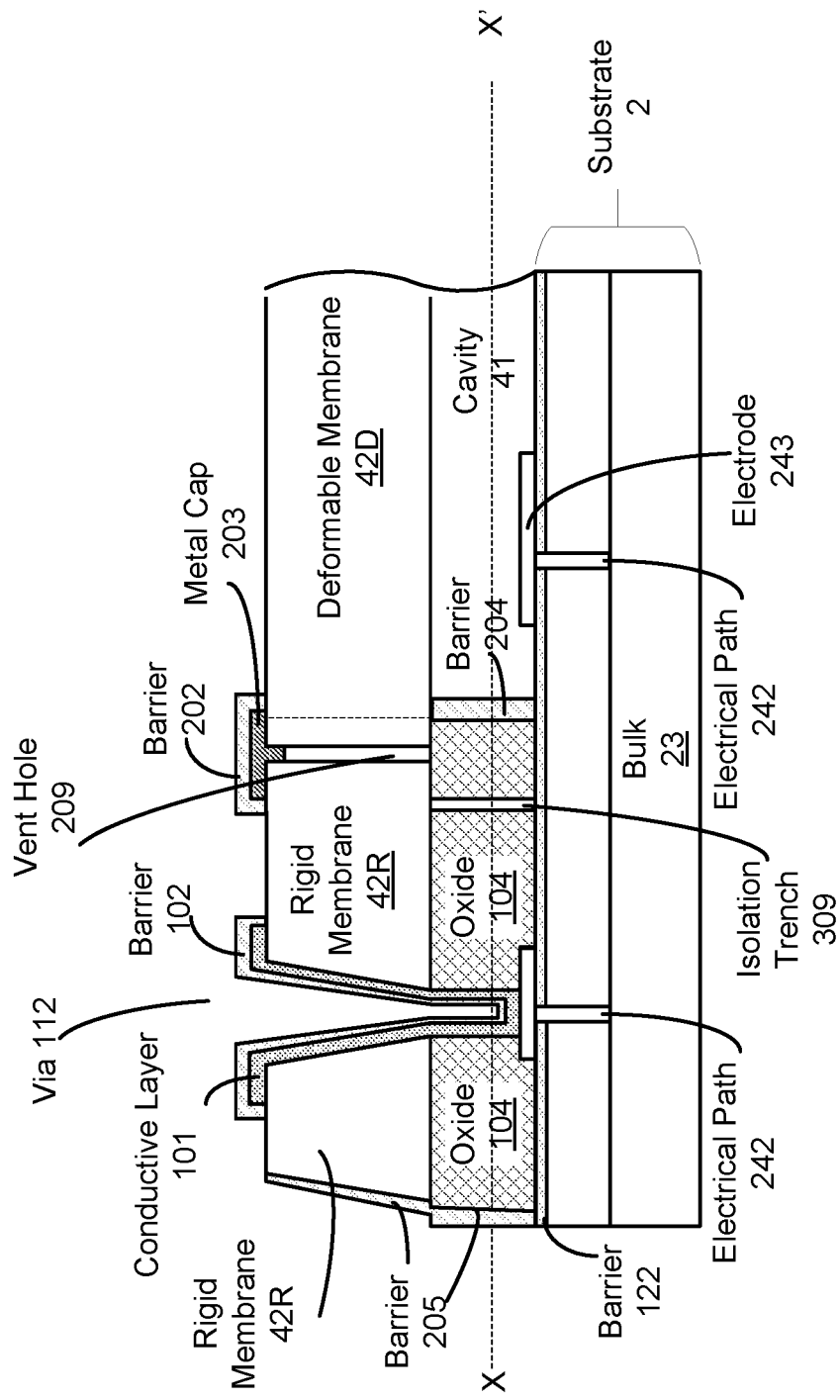
FIG. 3D shows a sensor device with a deep isolation trench in the interior portion of the membrane and two lateral barrier layer dielectrics coating oxide layers according to one aspect of the present embodiments.

FIG. 3D shows a sensor device with a deep isolation trench in the oxide layer 104 two lateral barrier layer coating oxide layers according to one aspect of the present embodiments. The embodiment of FIG. 3D is a combination of the embodiments in FIGS. 3B and 3C to include two dielectric layers, barrier layer 204 and 205 layers, covering the lateral walls of the oxide layer 104 both in the cavity 41 and outer periphery as well as the out walls of the rigid membrane.

Figure 3E:
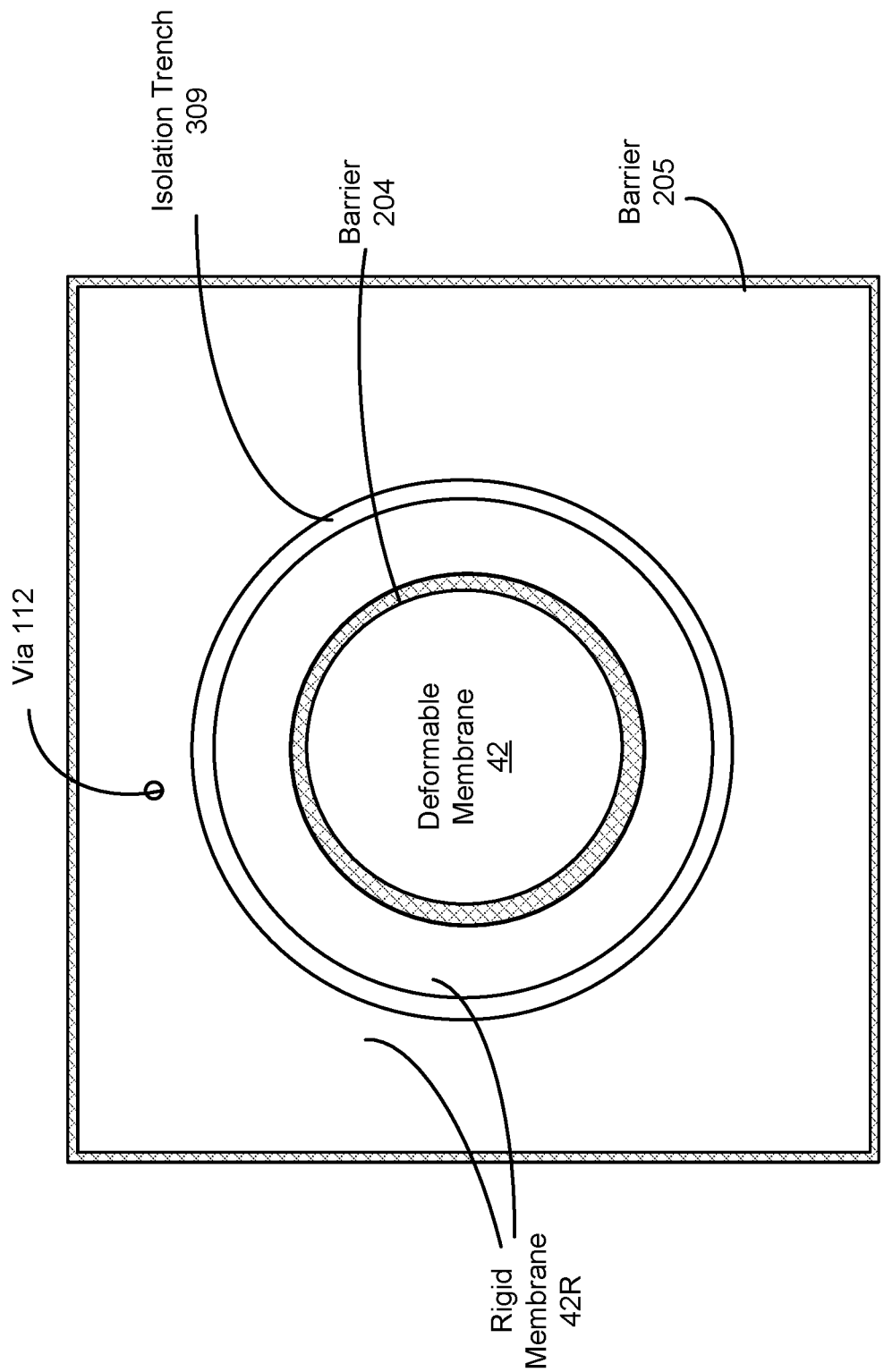
FIG. 3E shows the top view of FIG. 3D.

It is appreciated that the isolation trench 309 may extend into the rigid membrane 42R (similar to that of FIG. 3B) in some embodiments. It is also appreciated that the isolation trench 309 extending into the rigid membrane 42R may be sealed with a cap 203, e.g., metal, and that the cap may be coated with a layer of barrier material 202. In some embodiments, the isolation trench 309 extending into the rigid membrane may be coated with a layer of barrier layer without being capped. It is appreciated that the trench 103 and/or 309 formed within the oxide layer may improve hermicity. Referring now to FIG. 3E, a top view of FIG. 3D is shown.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A sensor comprising:
   a substrate;
   an oxide layer disposed on the substrate;
   a membrane positioned on the oxide layer, wherein the membrane with the oxide layer and the substrate form an enclosed cavity therein, wherein the membrane comprises a rigid portion and a deformable portion wherein the deformable portion of the membrane deforms responsive to stimuli, wherein the oxide layer forms side walls of the cavity;
   an electrode positioned on the substrate and within the cavity; and
   a trench formed in the oxide layer, and wherein the trench is lined with a first barrier material.

2. The sensor of claim 1, wherein the trench surrounds the cavity.

3. The sensor of claim 1, wherein the trench is disposed between the cavity and an outer periphery of the sensor.

4. The sensor of claim 1, wherein the trench extends into the rigid portion of the membrane.

5. The sensor of claim 4, wherein the trench faces external environment and away from the substrate.

6. The sensor of claim 1, wherein the barrier material comprises at least one of silicon nitride or metal layer.

7. The sensor of claim 1, wherein an interior surface of the oxide layer forming the side walls of the cavity is lined with a second barrier layer.

8. The sensor of claim 1, wherein an exterior surface of the oxide layer forming the side walls of the cavity is lined with a third barrier layer.

9. The sensor of claim 1 further comprising a fourth barrier layer lining outside surface of sidewalls of the membrane.

10. The sensor of claim 1 further comprising a fifth barrier layer disposed between the oxide layer and the substrate.

11. A sensor comprising:
    a substrate;
    an oxide layer disposed on the substrate;
    a membrane positioned on the oxide layer, wherein the membrane, the oxide layer and the substrate form an enclosed cavity therein, wherein the membrane comprises a rigid portion and a deformable portion and wherein the deformable portion deforms responsive to stimuli, wherein the oxide layer forms side walls of the cavity;
    an electrode positioned on the substrate and within the cavity; and
    a trench formed in the oxide layer and enclosed by the membrane and the substrate.

12. The sensor of claim 11 further comprising a vent hole formed within the rigid portion of the membrane.

13. The sensor of claim 12, wherein the trench and the vent hole are aligned and connected to one another.

14. The sensor of claim 12, wherein the vent hole is sealed by a cap, and wherein the cap is coated with a layer of barrier material.

15. A sensor comprising:
    a substrate;
    an oxide layer disposed on the substrate;
    a membrane positioned on the oxide layer, wherein the membrane with the oxide layer and the substrate form an enclosed cavity therein, wherein the oxide layer comprises an inner wall that extends laterally from the membrane to the substrate and forming side walls of the cavity and wherein the oxide layer comprises an outer wall that extends laterally from the membrane to the substrate facing away from the cavity, and wherein the membrane comprises a rigid portion and a deformable portion wherein the deformable portion deforms responsive to stimuli, wherein the inner wall or the outer wall is coated with a layer of barrier material; and an electrode positioned on the substrate and within the cavity.

16. The sensor of claim 15, wherein the layer of barrier material comprises at least one of silicon nitride or metal layer.

17. The sensor of claim 15, wherein the oxide layer is a high density plasma oxide layer.

18. The sensor of claim 15, wherein a top surface of the substrate is coated with another layer of barrier material.

19. The sensor of claim 15 further comprising a trench formed within the rigid portion of the membrane.

20. The sensor of claim 19, wherein the trench is sealed by a cap.

21. The sensor of claim 19, wherein the trench is coated with a layer of barrier material.

22. The sensor of claim 15 further comprising a trench formed within the oxide layer.

23. The sensor of claim 22 further comprising a vent hole formed within the rigid portion of the membrane.

24. The sensor of claim 23, wherein the trench and the vent hole are aligned and wherein the vent hole is capped.

* * * * *